United States Patent
Taillardat

(10) Patent No.: US 9,276,457 B2
(45) Date of Patent: Mar. 1, 2016

(54) ELECTRIC DRIVETRAIN OF A DEVICE, AND GAS COMPRESSION EQUIPMENT INCLUDING SUCH A DRIVETRAIN

(71) Applicant: GE Energy Power Conversion Technology Ltd., Rugby Warwickshire (GB)

(72) Inventor: Jean-Marc Taillardat, Paris (FR)

(73) Assignee: GE ENERGY POWER CONVERSION TECHNOLOGY LTD., Rugby Warwickshire (GB)

( * ) Notice: Subject to any disclaimer, the term of this patent is extended or adjusted under 35 U.S.C. 154(b) by 134 days.

(21) Appl. No.: 14/102,841

(22) Filed: Dec. 11, 2013

(65) Prior Publication Data

US 2014/0161646 A1 Jun. 12, 2014

(30) Foreign Application Priority Data

Dec. 12, 2012 (FR) ...................................... 12 61966

(51) Int. Cl.
*H02P 27/04* (2006.01)
*H02M 1/12* (2006.01)
*H02P 27/14* (2006.01)
*H02M 1/14* (2006.01)
*H02M 7/487* (2007.01)

(52) U.S. Cl.
CPC *H02M 1/12* (2013.01); *H02M 1/14* (2013.01); *H02P 27/14* (2013.01); *H02M 7/487* (2013.01)

(58) Field of Classification Search
CPC ......... F04C 23/02; H02K 21/14; F15B 1/033; F15B 2211/20515
See application file for complete search history.

(56) References Cited

U.S. PATENT DOCUMENTS

| | | | |
|---|---|---|---|
| 5,416,458 | A | 5/1995 | Croft |
| 6,169,677 | B1 | 1/2001 | Kitahata |
| 2005/0232791 | A1* | 10/2005 | Bahnen ...................... 417/410.4 |
| 2009/0045782 | A1 | 2/2009 | Datta et al. |

FOREIGN PATENT DOCUMENTS

| | | |
|---|---|---|
| EP | 1641111 | 3/2006 |
| EP | 2202875 | 6/2010 |
| FR | 2949920 A1 | 3/2011 |
| GB | 2456917 | 8/2009 |
| WO | 9010339 | 9/1990 |
| WO | 2012016062 | 2/2012 |

OTHER PUBLICATIONS

Translation of French Search Report and Written Opinion from corresponding French Application No. 1261966, Dated Sep. 4, 2013.

* cited by examiner

*Primary Examiner* — Karen Masih

(74) *Attorney, Agent, or Firm* — GE Global Patent Operation; Catherine J. Toppin

(57) ABSTRACT

An electric drivetrain of a device, such as a gas compression device, includes an electric machine and a system for supplying power to the electric machine, the electric machine including a rotor and a stator. The electric machine is an asynchronous electric machine, and the power supply system is suitable for supplying voltage to the stator of the electric machine, the power supply system making up a source of voltage.

16 Claims, 5 Drawing Sheets

ELECTRIC DRIVETRAIN OF A DEVICE, AND GAS COMPRESSION EQUIPMENT INCLUDING SUCH A DRIVETRAIN

FIELD OF THE INVENTION

Embodiments of the present invention involve an electric drivetrain of a device, such as a gas compression device, said drivetrain including an electric machine and a power supply system of the electric machine, the electric machine including a rotor and a stator.

In particular, embodiments of the present invention apply to an electric drivetrain of a gas compression device, the drivetrain including a high-powered electric machine, typically more than 60 MW.

Embodiments of the present invention also involve gas compression equipment including such an electric drivetrain.

BACKGROUND OF THE INVENTION

An electric drivetrain of the aforementioned type is known. Such an electric drivetrain includes a synchronous electric machine comprising an electrically powered stator and rotor, as well as a variable frequency converter of the load-commutated converter type, connected to the stator of the electric machine. The variable frequency converter comprises a bridge rectifier of thyristors designed to be connected to an incoming three-phase electrical grid and a bridge inverter of thyristors connected on the output side of the rectifier. The incoming electrical grid is produced by an upstream electrical unit made up of a combination of gas turbines and electric generators. The thyristors of the inverter are guided by inverter restraint, whereas those of the bridge rectifier regulate the current. The variable frequency converter thus provides a source of current, able to power the stator of the synchronous electric machine.

However, such an electric drivetrain generates, both on the side of the incoming electrical grid and the side of the synchronous electric machine, harmonic currents of a frequency equal to an uneven multiple of the frequency of the primary current, this uneven multiple not being a multiple of 3. These harmonic currents give rise to coupled harmonics being applied along the downstream drive line of the gas compression device, and on the upstream drive line of the turbines producing the input electrical grid. These coupled harmonics are likely to energize the resonance frequency of this equipment, which can lead to its deterioration, even its destruction.

Moreover, such a drivetrain likewise generates inter-harmonic currents, both on the side of the input electrical grid and the side of the synchronous electric machine. These inter-harmonic currents give rise to cogging, which is likely to energize the frequencies of the very modes of the upstream and downstream drive lines and thus damage these lines.

In addition, such a drivetrain requires using a dedicated electric power supply for the rotor of the electric machine, said electric power supply requiring a high number of individual components. Some of these components are, for example, diodes mounted on the rotor. Because of the significant mechanical constraints applied to these "rotating" diodes, they present reliability problems. This decreases the reliability of the drivetrain unit and creates high manufacturing and maintenance costs.

BRIEF DESCRIPTION OF THE INVENTION

Embodiments of the present invention propose an electric drivetrain that makes it possible to reduce the range of the harmonic currents and the inter-harmonic currents generated within the drivetrain, while improving the reliability and reducing the manufacturing and maintenance costs.

As such, embodiments of the present invention provide an electric drivetrain of the aforementioned type, in which the electric machine is an asynchronous electric machine, and the power supply system is used to power the stator of the electric machine, the power supply system being a source of voltage.

According to other embodiments of the present invention, the electric drivetrain includes one or more of the following features, taken individually or according to all the technically possible combinations:

According to an embodiment, the power supply system is suitable for being electrically connected to an AC electrical grid having N phases, N being a whole number greater than or equal to one, and the power supply system includes: N terminals for connection to the AC electrical grid, one or more connection terminals corresponding to a phase of the grid, P terminals for connection to the stator of the electric machine, P being a whole number greater than or equal to one, a first device for converting AC voltage having N phases to at least one DC voltage, and a second device for converting at least one DC voltage into an AC voltage having P phases, the second conversion device being connected between the first conversion device and the stator of the electric machine.

The first conversion device includes M1 first modules for converting AC input voltage to DC output voltage, M1 being a whole number greater than or equal to 2, the M1 first modules being connected in parallel to each other, each first conversion module having at least N first intermediate input terminals, one or more first intermediate input terminals corresponding to a phase of the incoming AC voltage, each first conversion module being suitable for converting the AC input voltage having N phases into intermediate DC voltage supplied to multiple first intermediate output terminals.

The second conversion device includes M2 second modules for converting DC input voltage into AC output voltage, M2 being a whole number greater than or equal to 2, the M2 second modules being connected in parallel to each other, each second conversion module having three second intermediate input terminals, each second conversion module being able to convert one of the intermediate DC voltages into AC output voltage having P phases and supplied to P second intermediate output terminals, one or more second intermediate output terminals corresponding to a phase of the AC output voltage, the second intermediate output terminals corresponding to a same phase being connected to the corresponding connection terminal.

In an embodiment, the power supply system also includes M capacitor banks, M being a whole number greater than or equal to 2, each capacitor bank having at least one capacitor, and whole numbers M, M1 and M2 are equal to each other, the M first modules and the M second modules each being connected to a corresponding capacitor bank.

In an embodiment, each second conversion module includes a voltage inverter with P phases connected to the three second intermediate input terminals, and a magnetic coupling connected to the output side of the voltage inverter.

In an embodiment, the voltage inverter includes P switching paths, each path having at least two electronic controllable switches connected in series at a connection point, each connection point being connected to the magnetic coupling, and the power supply system also includes a device for calculating the control signals of the electronic inverter switches, said device having the means for a time lag of the carrier signals of at least two corresponding inverters.

In an embodiment, each first conversion module includes N first intermediate input terminals, a magnetic coupling connected to the N first intermediate input terminals, and a voltage rectifier with N phases connected on the output side of the magnetic coupling.

In an embodiment, the voltage rectifier includes N switching paths, each path having at least two electronic controllable switches connected in series at a connection point, each connection point being connected to the magnetic coupling.

In an embodiment, the power supply system also includes, for each switching path of each voltage rectifier and each voltage inverter, means of synchronizing the switching of the electronic switches of that path.

In an embodiment, each first conversion module includes N×Q first intermediate input terminals, Q being greater than or equal to two, and a voltage rectifier with N phases connected to said first intermediate input terminals, the voltage rectifier with N phases having Q diode bridges connected in series, each diode bridge having N one-way circulation paths of a current, each path having at least two diodes connected in series at a connection point, each connection point being connected to a first intermediate input terminal.

According to an embodiment of the present invention, there is provided a gas compression equipment, including a gas compression device and an electric drivetrain of the compression device, in which the electric drivetrain is the same as the one described heretofore.

BRIEF DESCRIPTION OF THE DRAWINGS

These features and advantages of embodiments of the present invention will appear when reading the description that follows, given only by way of a non-limiting example, and referred to in the attached drawings, in which.

DETAILED DESCRIPTION OF THE INVENTION

Figure 1:
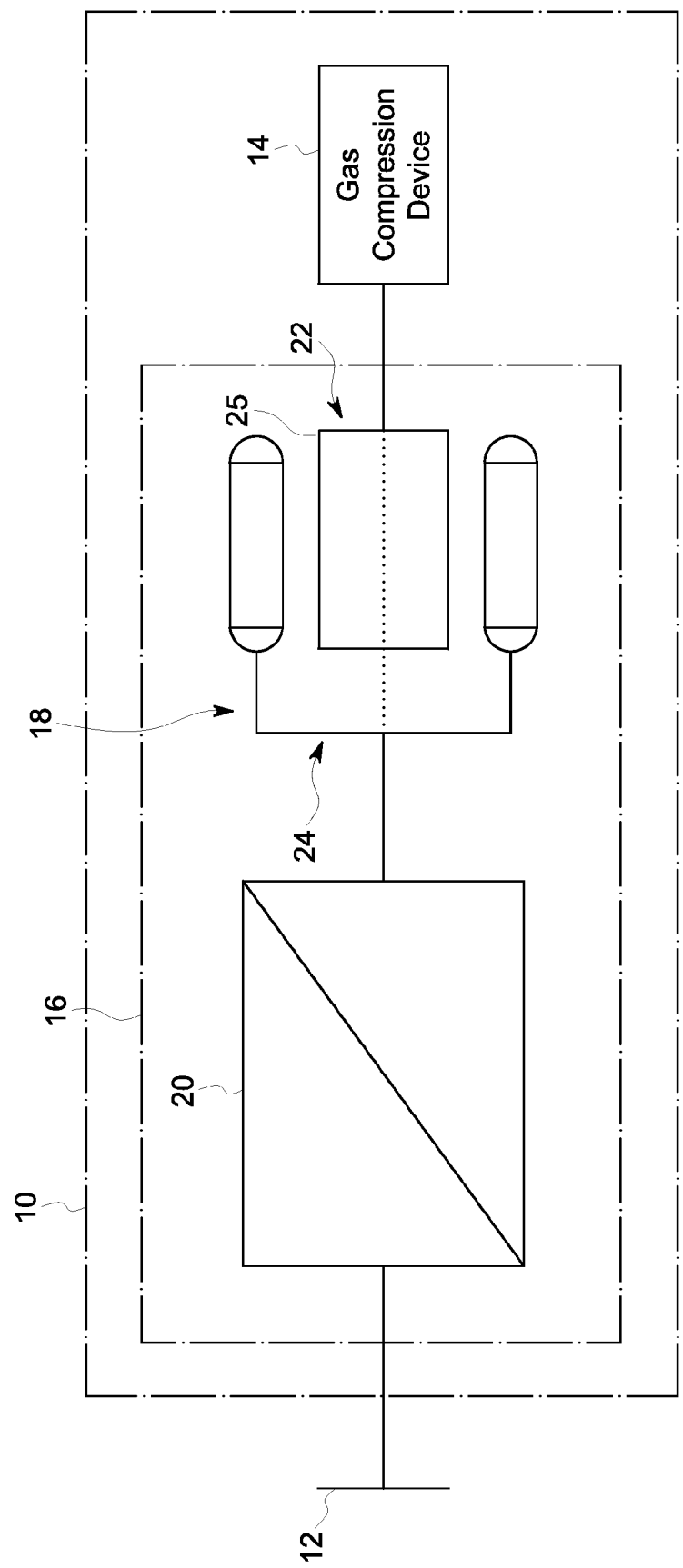
FIG. 1 is a schematic view of gas compression equipment according to an embodiment of the present invention, including a gas compression device and an electric drivetrain to run the compression device.

In FIG. 1, gas compression equipment 10 is connected to an electrical grid 12. The electrical grid 12 is, for example, an AC multiple-phase grid with N phases, N being a whole number greater than or equal to one. The electrical grid 12 has high voltage, of a value typically along the order of 132 kV.

The equipment 10 includes a gas compression device 14 and an electric drivetrain 16 of the gas compression device 14 connected to the compression device 14. The gas compression device 14 has a nominal high voltage, of a value greater than 50 MW, for example, equal to 80 MW.

The electric drivetrain 16 includes an electric machine 18 and a power supply system 20 of the electric machine 18, connected to the electrical grid 12.

The electric machine 18 is, according to embodiments of the present invention, an asynchronous electric machine. It comprises a rotor 22 and a stator 24.

The rotor 22 is equipped with a shaft 25 connected to the compression device 14 and suitable for rotating the compression device 14. The shaft 25 is made up of an assembly between a metal "squirrel cage" type armature, of a known type, and laminated plates. The metal armature has several parallel bars for short-circuiting. The laminated plates are pressed together. They are held together by lengthwise cords running through them from one end to the other, and by the parallel bars of the metal armature, which also run through them. This makes it possible to avoid the manifestation of undesirable Foucault currents on the surface of the rotor 22, and thus improve the electrical output and the power factor of the electric machine 18. In addition, such a setup of the rotor 22 makes it possible to preserve the structural integrity of same when running, in view of the rotation speeds and very large sizes of the electric machine 18 within the context of the technical application in question. The rotor 22 has a nominal rotation speed of a value, for example, equal to 250 m·s$^{-1}$.

The stator 24 includes windings designed to be powered by the power supply system 20. The electric machine 18 is, for example, a multi-phase asynchronous electric machine with P phases, P being a whole number greater than or equal to one. The electric machine 18 has a nominal power of a value greater than 60 MW, for example, equal to 80 MW. It has a nominal voltage of a value, for example, roughly equal to 11 kV.

Figure 2:
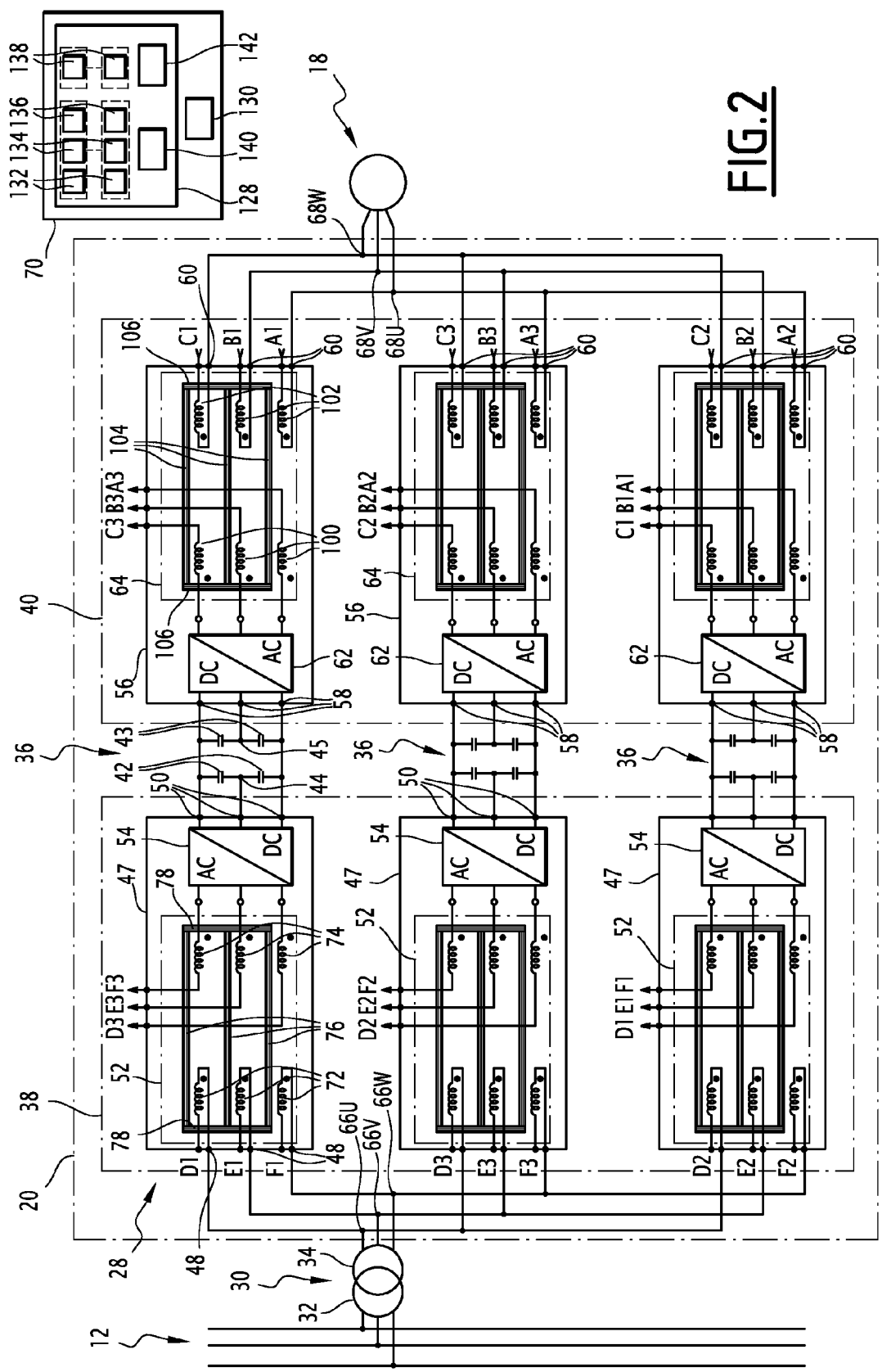
FIG. 2 is an electrical diagram of the electric drivetrain in FIG. 1, according to an embodiment, having a first conversion device including three voltage rectifiers connected in parallel, and a second conversion device including three voltage inverters connected in parallel.

As illustrated in FIG. 2, the power supply system 20 includes an AC input voltage converter 28 with N phases for converting to AC output voltage with P phases. The converter 28 is electrically connected to the electrical grid 12, for example, by means of a voltage transformer 30, suitable for adapting the voltage value between the grid 12 and the converter 28. The converter 28 is also electrically connected to the stator 24 of the electric machine 18.

The voltage transformer 30 comprises a primary winding 32 and a secondary winding 34, and is suitable for transforming the high AC voltage supplied by the electrical grid 12 into lower AC voltage. More precisely, the voltage transformer 30 is suitable for supplying a current having a low value voltage, for example, equal to 13 kV, from the high voltage of the electrical grid 16, for example, equal to 132 kV.

The power supply system 20 according to embodiments of the present invention, makes up a source of voltage that is able to power the stator 24 of the electric machine 18, as explained in detail hereafter.

In the example of the embodiment of FIG. 2, N is equal to 3, the electrical grid 12 being a three-phase grid. Moreover, P is equal to 3, the electric machine 18 being a three-phase motor.

The converter 28 includes M capacitor banks 36, M being a whole number greater than or equal to two. The converter 28 also includes a first voltage conversion device 38 connected between the transformer 30 and the capacitor banks 36, and a second voltage conversion device 40 connected between the capacitor banks 36 and the stator 24 of the electric machine 18. The first conversion device 38 is suitable for converting the AC input voltage into at least one intermediate DC output voltage, as explained in detail hereafter. The second conversion device 40 is suitable for converting at least one intermediate input DC voltage into the AC output voltage, as also explained in detail hereafter.

In the embodiment of FIG. 2, M is equal to 3. The three capacitor banks 36 are different from each other, each bank 36 being connected between the first conversion device 38 and the second conversion device 40. Each capacitor bank 36 comprises two first capacitors 42 and two second capacitors 43. The two first capacitors 42 are connected to each other by a first neutral capacitive point 44, the two second capacitors 43 being connected to each other by a second neutral capacitive point 45. The electrode of each first capacitor 42 that is not connected to the first neutral point 44 is connected, at a connection point 46, to the electrode of a second capacitor 43 not connected to the second neutral point 45. The capacitors 42 and 43 are, for example, identical and have the same capacity.

The first conversion device 38 comprises M1 first voltage converting modules 47 connected in parallel to each other, M1 being a whole number greater than or equal to 1. In the embodiment in FIG. 2, M1 is equal to M, and the first conversion device 38 comprises three first conversion modules 47. Each first module 47 is connected between the voltage transformer 30 and a respective bank of capacitors 36.

It is specified that, in the continuation of the description, the side of the first modules 47 connected to the transformer 30 corresponds, by convention, to the input of the first modules 47, and the side of the first modules 47 connected to a bank of capacitors 36 corresponds to the output of the first modules 47.

Each first module 47 includes three input terminals 48 and three output terminals 50. Each first module 47, in an embodiment, includes a first magnetic coupling 52 connected to the three input terminals 48. Each first module 47 also includes a voltage rectifier 54 with N phases connected on the output side of the first magnetic coupling 52.

Each first module 47 is suitable for converting the AC input voltage to intermediate DC voltage supplied to its three input terminals 50.

The second conversion device 40 comprises M2 second voltage converting modules 56 connected in parallel to each other, M2 being a whole number greater than or equal to 1. In the embodiment in FIG. 2, M2 is equal to M, and the second conversion device 40 comprises three second conversion modules 56. Each module 56 is connected between a respective bank of capacitors 36 and the stator 24 of the electric machine 18.

By convention, in the continuation of the description, the side of the second modules 56 connected to a bank of capacitors 36 corresponds to the input of the second modules 56, and the side of the second modules 56 connected to the stator 24 corresponds to the output of the second modules 56.

Each second module 56 includes three input terminals 58, three output terminals 60, a voltage inverter 62 with P phases connected to the three input terminals 58, and a second magnetic coupling 64 connected to the output side of the inverter 62.

Each second module 56 is suitable for converting intermediate DC input voltage into AC output voltage, supplied to its three output terminals 60.

The power supply system 20 includes three first terminals 66U, 66V and 66W connected to the voltage transformer 30 and three second terminals 68U, 68V and 68W connected to the stator 24. Each first connection terminal 66U, 66V and 66W is connected to the respective input terminals 48 of each first conversion module 47 which correspond to the same phase of the AC input current.

Each second connection terminal 68U, 68V and 68W is connected to the respective output terminals 60 of each second conversion module 56 which correspond to the same phase of the AC output current.

The power supply system 20 includes three first terminals 66U, 66V and 66W connected to the voltage transformer 30 and three second terminals 68U, 68V and 68W connected to the stator 24. Each first connection terminal 66U, 66V and 66W is connected to the respective input terminals 48 of each first conversion module 47 which correspond to the same phase of the AC input current.

Each second connection terminal 68U, 68V and 68W is connected to the respective output terminals 60 of each second conversion module 56 which correspond to the same phase of the AC output current.

The power supply system also includes a device 70 for calculating the control signals from electronic switches of the rectifiers 54 and the inverters 62.

One of the output terminals 50 of each first conversion module 47 is connected to a first neutral point 44 of a bank of capacitors 36, each output terminal 50 being connected to a respective connection point 46 of this bank 36.

Each first magnetic coupling 52 includes N first electromagnetic coupling coils 72, N second electromagnetic coupling coils 74 and N magnetic cores 76, the cores 76 being connected to each other by linking magnetic bars 78. Each first coil 72 and each second coil 74 is wound around a respective core 76.

Each first magnetic coupling 52 makes up a magnetic coupling device as described, for example, in the document FR 2940550. The connections of the coupling coils 72 and 74 thus will not be described in detail, since a person skilled in the art can in fact easily deduce this on page 10, lines 3 to 24 of the document FR 2940550, by replacing the inverters described in this document by the rectifiers 54.

Figure 3:
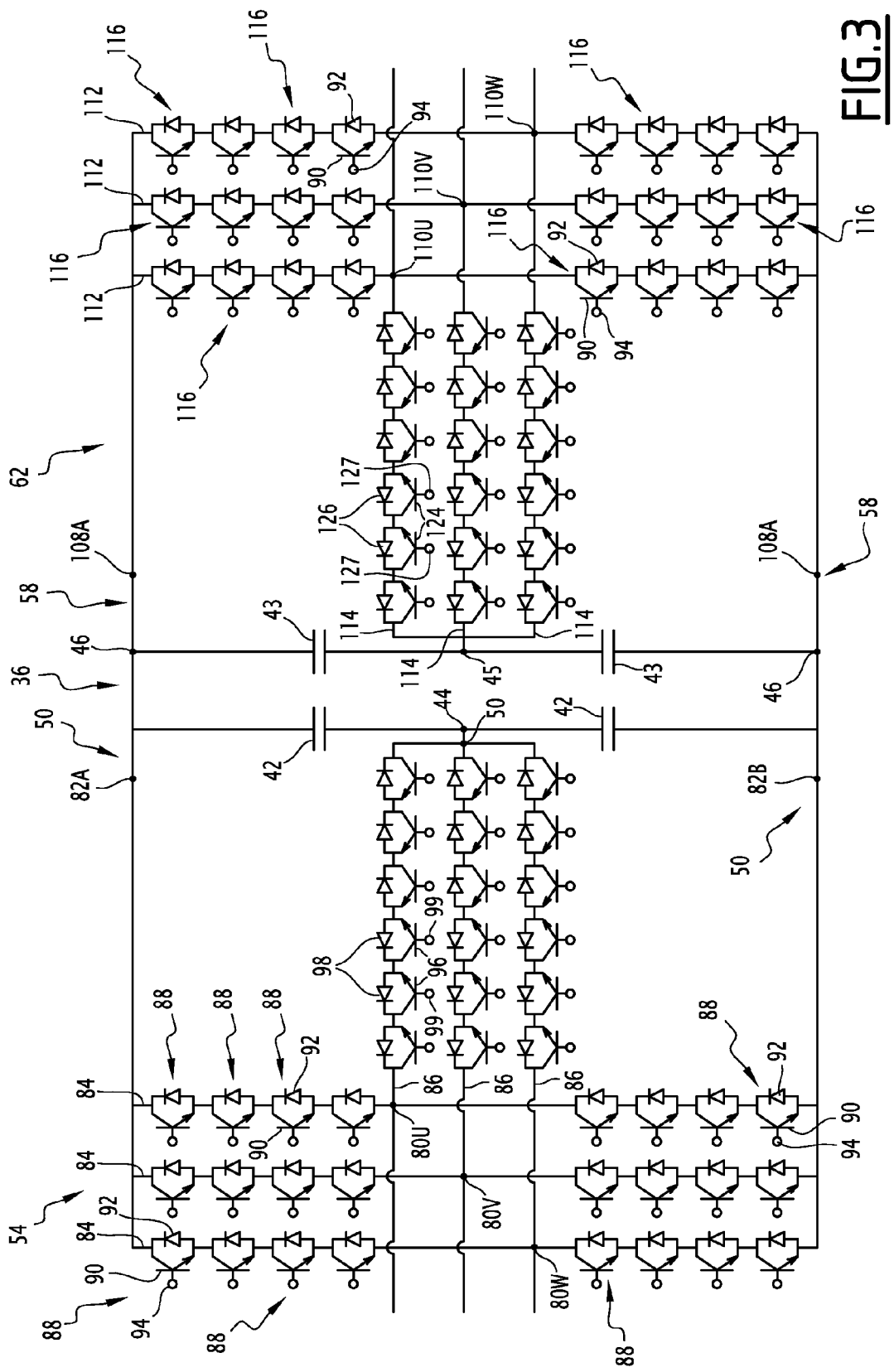
FIG. 3 is an electrical diagram representing one of the voltage rectifiers and one of the voltage inverters from FIG. 2.

As shown in FIG. 3, each voltage rectifier 54 includes N input terminals 80U, 80V and 80W, a positive output terminal 82A, and a negative output terminal 82B.

Each input terminal 80U, 80V and 80W corresponds to a respective phase of the AC input voltage and is connected to one end of a second respective coupling coils 74 of the first related magnetic coupling 52.

Each output terminal 82A and 82B makes up one of the output terminals 50 connected to the connection points 46.

In the embodiment in FIGS. 2 and 3, each rectifier 54 also includes, for each input terminal 80U, 80V and 80W corresponding to a respective phase U, V and W, a switching path 84 connected between the two input terminals 82A and 82B and a clamping path 86 connecting the neutral to a middle point of the related switching path. Each rectifier 54 is thus, in this embodiment, an "active" three-phase three-level rectifier of the type clamped by the neutral, also called an NPC rectifier (from the English Neutral Point Clamped). As a variation, each rectifier 54 is an "active" three-phase three-level rectifier of the type piloted by the neutral, also called an NPP rectifier (from the English Neutral Point Piloted).

Each switching path 84 includes at least two controllable electronic switches 88 connected in series and in the same direction, and connected to each other by a middle point, each middle point making up an input terminal 80U, 80V and 80W. In the embodiment in FIG. 3, each switching path 84 includes eight switches 88 connected in series.

As is known, each electronic switch 88 is a two-way switch on current and one-way on voltage.

Each electronic switch 88 includes a transistor 90 and a diode 92 connected in anti-parallel, thus ensuring two-way flow patterns of current when the transistor 90 is flowing. Each electronic switch 88 also includes an excitation circuit 94 of the transistor 90, connected to a control electrode of the transistor 90.

All of the transistors 90 are, for example, identical. Each transistor 90 is, for example, an injector-enhanced gate bipolar transistor, also called an IEGT transistor (from the English Injection-Enhanced Gate Bipolar Transistor).

Is a variation the IEGT transistor 90 is replaced by any controllable transistor such as, for example, an insulated gate bipolar transistor, also called an IGBT transistor (from the English Insulated Gate Bipolar Transistor).

Each excitation circuit 94 is connected to the device 70 for calculating the control signals, in order to receive a corresponding control signal.

Each clamping path 86 is connected between the output terminal 50 connected to the first neutral point 44, and an input terminal 80U, 80V and 80W. Each clamping path 86 comprises at least two transistors 96 connected head to tail and in series. It also comprises at least two diodes 98, each one being connected in anti-parallel to a respective transistor 96, thus ensuring two-way circulation flows of current when the corresponding transistor 96 is flowing. Each clamping path includes, in addition, at least two excitation circuits 99 of the transistors 96, each excitation circuit 99 being connected to a control electrode of a transistor 96. In the embodiment in FIG. 3, each clamping path 86 includes six transistors 96 connected in series, as well as six diodes 98 and six excitation circuits 99 related to the transistors 96. Three first transistors 96 are connected according to the same first direction. The three other transistors 96 are connected according to a second direction opposite to the first direction.

All the transistors 96 are, for example, identical. Each transistor 96 is, for example, an IEGT transistor.

As a variation, the IEGT transistor 96 is replaced by any controllable transistor, such as, for example, an insulated gate bipolar transistor, also called an IGBT transistor (from the English Insulated Gate Bipolar Transistor).

Each transistor 90 and 96 has a "short-circuiting" type failure mode. In other words, in case a failure condition occurs owing to transistor 90 and 96, for example, in the case of voltage to the transistor terminals higher than its breakdown voltage, the transistor 90 and 96 then locks up in its conductive state, regardless of the value of its control.

Each excitation circuit 99 is connected to the device 70 for calculating control signals, in order to receive a corresponding control signal.

In an embodiment, each excitation circuit 94, 99 is sized so that under a "normal" operating system, the combined voltage of the IEGT transistor terminals 90 and 96 is slightly less than its nominal operating voltage.

This allows setting up a redundancy of the IEGT transistors 90 and 96 and ensuring proper operation of the converter 28 when one of the transistors 90 and 96 fails and is locked up in the conductive state. In other words, for each switching path 84 of each rectifier 54, one of the transistors 90 of each path, as well as the diode 92 and the excitation circuit 94 combined, are "additional" components inserted in the path to make the converter 28 "tolerant" of the failure of one of the transistors 90 of this path. In case of a failure of one of the transistors 90 of the path 84, the converter 28 thus supplies the same electrical power to the electric machine 18 as the electrical power supplied before the failure of this transistor. Likewise, for each clamping path 86 of each rectifier 54, one of the transistors 96 of this path, as well as the diode 98 and the excitation circuit 99 combined, are "additional" components inserted in the path to make the converter 28 "tolerant" of the failure of one of the transistors 96 of this path.

Coming back to FIG. 2, one of the input terminals 58 of each second conversion module 56 is connected to the second neutral point 45 of a bank of capacitors 36, each other input terminal 58 being connected to a connection point 46 in relation to this bank 36.

Each second magnetic coupling 64 includes N first electromagnetic coupling coils 100, N second electromagnetic coupling coils 102 and N magnetic cores, 104, the cores 104 being connected to each other by linking bar magnets 106. Each first coil 100 and each second coil 102 is wound around a respective core 104.

Each second magnetic coupling 64 making up a magnetic coupling device as described, for example, on page 10, lines 3 to 24 of the document FR 2940550, the connections of the coupling coils 100 and 102 will not be described in greater detail.

The magnetic couplings 52 and 64 make it possible to obtain a weaker common mode induction among the phases of the various rectifiers 54 or among the phases of the various inverters 62, and thus reduce the voltage drops of the line generated, in particular, the voltage drops among the first connection terminals 66U, 66V and 66W and the voltage drops among the second connection terminals 68U, 68V and 68W.

As shown in FIG. 3, each voltage inverter 62 includes a positive input terminal 108A, a negative input terminal 108B and P output terminals 110U, 110V and 110W. Each input terminal 108A and 108B make up one of the input terminals 58 connected to connection points 46. Each output terminal 110U, 110V and 110W corresponds to a respective phase of the AC output voltage and is connected to one end of a first respective coupling coil 100 of the second related magnetic coupling 64.

Each inverter 62 also includes, for each output terminal 110U, 110V and 110W, corresponding to a respective phase U, V and W, a switching path 112 connected between the two input terminals 108A and 108B and a clamping path 114 connecting the neutral at a middle point of the related switching path. Each inverter 62 is thus, in the embodiment in FIG. 3, a three-phase, three-level inverter clamped by the neutral, also called an NPC inverter (from the English Neutral Point Clamped). As a variation, each inverter 62 is a three-phase, three-level inverter piloted by the neutral, also called an NPP rectifier (from the English Neutral Point Piloted).

Each switching path 112 includes at least two controllable electronic switches 116 connected in series and in the same direction, and connected to each other by a middle point, each middle point making up an output terminal 110U, 110V and 110W. In the embodiment in FIG. 3, each switching path 112 includes eight switches 116 connected in series.

Since the structure of each electronic switch 116 of the inverters 62 is analogous to that of an electronic switch 88 of a rectifier 54, the latter will not be described in greater detail.

Each clamping path 114 comprises at least two transistors 124 connected head to tail and in series. It also comprises at least two diodes 126, each being connected in anti-parallel to a respective transistor 124, thus ensuring two-way flow patterns of current when the corresponding transistor 124 is conductive. Each clamping path comprises, in addition, at least two excitation circuits 127 of the transistors 124, each excitation circuit 127 being connected to a control electrode of a transistor 124. In the embodiment in FIG. 3, each clamping path 114 includes six transistors 124 connected in series, as well as six diodes 126 and six excitation circuits 127 related to the transistors 124.

Three first transistors 124 are connected according to a same first direction. The three other transistors 124 are connected according to a second direction opposite to the first direction. Since the structure of the transistors 124 of the inverters 62 is analogous to that of the transistors 96 of the rectifiers 54, the latter will not be described in greater detail. Likewise, since the structure of the excitation circuits 127 of the inverters 62 is analogous to that of the excitation circuits 99 of the rectifiers 54, the latter will not be described in greater detail.

The calculation device 70 is arranged in a unit for controlling and piloting the switches and the transistors of the rectifiers 54 and the inverters 62, not shown. The calculation device 70 comprises a data processing unit made up, for example, of a memory 128 combined with a data processor 130. The memory 128 is able to store, for each inverter 62, software 132 for calculating a modulating signal, software 134 for determining a carrier signal and software 136 for calculating control signals of the switches 116 of this inverter, depending on the difference between the carrier signal and the modulating signal.

The memory 128 is also able to store, for each rectifier 54, software 138 for calculating control signals of the switches 88 and this rectifier 54. The memory 128 is also able to store software 140 for a time lag of the carrier signals of at least two corresponding inverters 62. It is also able to store software 142 for synchronizing the control of the switches 88 and 116 of the rectifiers 54 and the inverters 62.

As a variation, the calculation mechanism 132, the determination mechanism 134, the means of calculation 136 and 138, the means of a time lag 140 and the means of synchronization 142 are connected in the form of dedicated programmable logic circuits.

In the embodiment in FIG. 2, the means of a time lag 140 are means of a time lag of all the carrier signals from one inverter 62 to the other.

The structure and the operating principle of the calculation mechanism 132, the determination mechanism 134, the means of calculation 136 and the means of a time lag 140 are, for example, described in the document FR 2 949 920 A1, and thus will not be described in greater detail hereafter.

The synchronization software 142 is suitable for calculating, for each rectifier 54 and for each inverter 62, a synchronization signal of the control signals of the transistors 90 of a same switching path 84 and 112 or this rectifier 54 or this inverter 62, so as to allow the simultaneous switching of the transistors 90 of this path.

The synchronization software 142 is, moreover, suitable for synchronizing the sampling of the modulating signals among the three inverters 62. The sampling of the modulating signals is, for example, done from a clock signal common to the three calculation mechanisms 132.

As a complement, the synchronization software 142 is, for each rectifier 54 and for each inverter 62, suitable for indexing the control signal of each switch 88 and 116 of this rectifier or of this inverter at the immediate value of the voltage between the two connection points 46 of the related bank of capacitors 36. This provides the advantage of eliminating an undesirable phenomenon of generating inter-harmonic voltages due to the fluctuation of the bus voltage likely to appear within the capacitor banks 36.

The data processor 130 is suitable for calculating the control signals sent to the switches 88 and 116 and to the transistors 96 and 124. This calculation is made by implementing the processor 130 of the calculation software 132 and 136, the determination software 134, the time lag software 140 and the synchronization software 142, according, for example, to a classic voltage modulation procedure by pulse width with interlacing of the pulses and a phase shift between the control signals. Such a modulation process has the advantage of improving the overall waveform of the AC output voltage. Within the context of embodiments of the present invention, this leads to the advantage of reducing the amplitude of the harmonic currents and the resulting coupling harmonics on the side of the electric machine 18.

The controlling and piloting unit is thus suitable for applying each calculated control signal to the excitation circuits 94 of the electronic switches 88 and 116 and to the excitation circuits 99 and 127 of the transistors 96 and 124. In particular, the controlling and piloting unit is suitable, through the calculated synchronization signal, for piloting the excitation circuits 94 of the transistors 90 of a same switching path 84 and 112 of each rectifier 54 and each inverter 62, so as to allow the simultaneous switching of these transistors 90.

The operation of the electric drivetrain 16 according to embodiments of the present invention is going to be explained henceforth.

The electrical grid 12 powers the voltage transformer 30, which itself powers the converter 28. The controlling and piloting unit calculates the control signals of the switches 88 and 116 and the transistors 96 and 124 of the converter 28, and applies these control signals to the excitation circuits 94 of the electronic switches 88 and 116 and to the excitation circuits 99 and 127 of the transistors 96 and 124. The converter 28 then powers the stator 24 of the electric machine 18, which causes the rotor 22 to turn. Consequently, the rotor 22 in turn causes the compression device 14 to turn.

The electric drivetrain 16 according to embodiments of the present invention makes it possible to surprisingly obtain high output power from the electric machine 18, typically a power of value greater than 60 MW, for example, equal to 80 MW. This power is reached without compromising the overall output of the drivetrain 16, and without mechanical and/or electronic deterioration of the various components of the drivetrain 16.

Moreover, the transistors 90 of each inverter 62 are voltage controlled according to a process of voltage modulation by pulse width. The power supply system 20 thus makes up a source of voltage suitable for supplying voltage to the stator 24 of the asynchronous electric machine 18. The electric drivetrain 16 according to embodiments of the present invention thus makes it possible, through the structure of its power supply system 20, to reduce the coupling harmonics generated by the harmonic currents circulating on the side of the electric machine 18.

The power supply system 20 also makes it possible to eliminate the cogging generated by the inter-harmonic currents circulating on the side of the electrical grid 12, as well as the cogging generated by the inter-harmonic currents circulating on the side of the electric machine 18.

In addition, the power supply system 20 imposes no particular constraints on the actual reactance of the electric machine 18, contrary to the converters of electric drivetrains of the prior art. This allows a user to be able to freely set the actual reactance value of the electric machine 18. By choosing a voluntarily high value for this reactance, the user can thus reduce the amplitude of the short-circuit current and of the short-circuit coupling operating within the electric machine 18. This allows improvement of the general mechanical resistance of the electric machine 18 and the compression device 14.

The use of an asynchronous electric machine 18 makes it possible to eliminate the use of an electric power supply of the rotor, which power supply is necessary in the case of synchronous electric machines of the prior art.

This especially simplifies the mechanical structure of the drivetrain 16: indeed, the use of a diode rectifier for supplying power to the rotor is then no longer necessary. Since such diodes are generally subject to extreme mechanical constraints, the manufacturing and maintenance costs are thus reduced.

Moreover, because the electric power supply for the rotor is eliminated, the number of platforms necessary for supporting the electric machine is reduced, which also contributes to reducing the manufacturing costs and simplifying the dynamic performance of the rotor. Moreover, the use of an asynchronous electric machine instead of a synchronous electric machine makes possible an reduction of the constraints for cooling the rotor. We can thus see that the electric drivetrain 16 according to embodiments of the present invention allows for a reduction of the amplitude of the harmonic currents and the inter-harmonic currents generated within the drivetrain 16, while having improved reliability and reduced manufacturing and maintenance costs.

In addition, compared to the drivetrain according to the second embodiment described hereafter, the drivetrain 16 according to the first embodiment makes it possible, through the structure of its first conversion device 38, to generate and absorb reactive energy to and from the electrical grid 12. This allows the use of the drivetrain 16 as a stabilizer of the grid voltage, for example, in case of a sudden voltage drop of the grid 12, on the one hand. On the other hand, within the context of drivetrains of high-powered gas compression devices, the use of underground electric cables over long distances leads to an overall parasitic capacitance. This parasitic capacitance is likely to produce a significant excess of reactive energy. This excess can then be absorbed by the drivetrain 16 according to the first embodiment of the present invention.

The first conversion device 38 according to the first embodiment also makes it possible to reduce the amplitude of the harmonic currents circulating on the side of the electrical grid 12. The first conversion device 38 also allows elimination of harmonic filters on the side of the electrical grid 12, such harmonic filters acting as sources of reactive power likely to complicate the electrical installation of the drivetrain 16.

Figure 4:
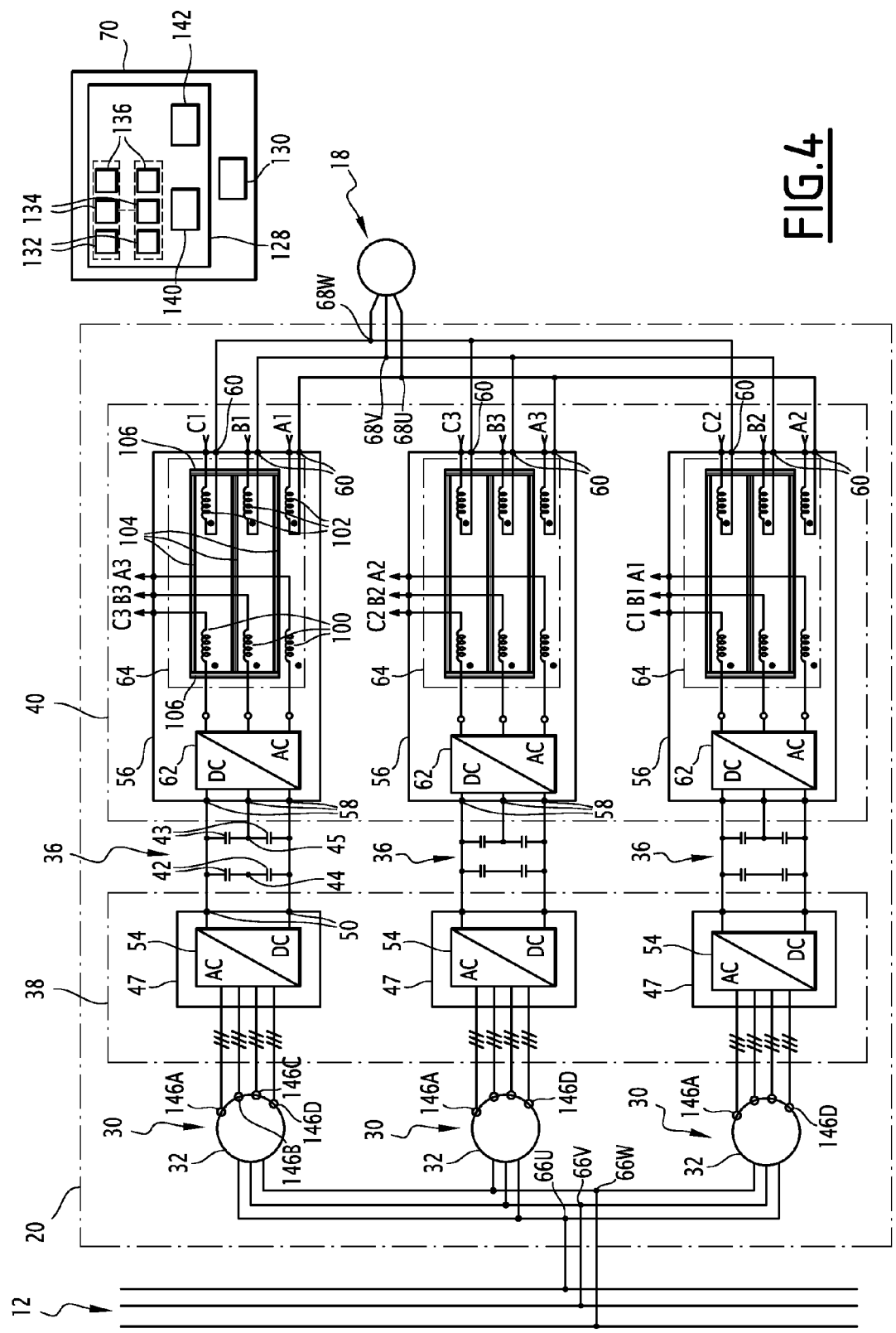
FIG. 4 is a view similar to that of FIG. 2 according to an embodiment of the present invention.
Figure 5:
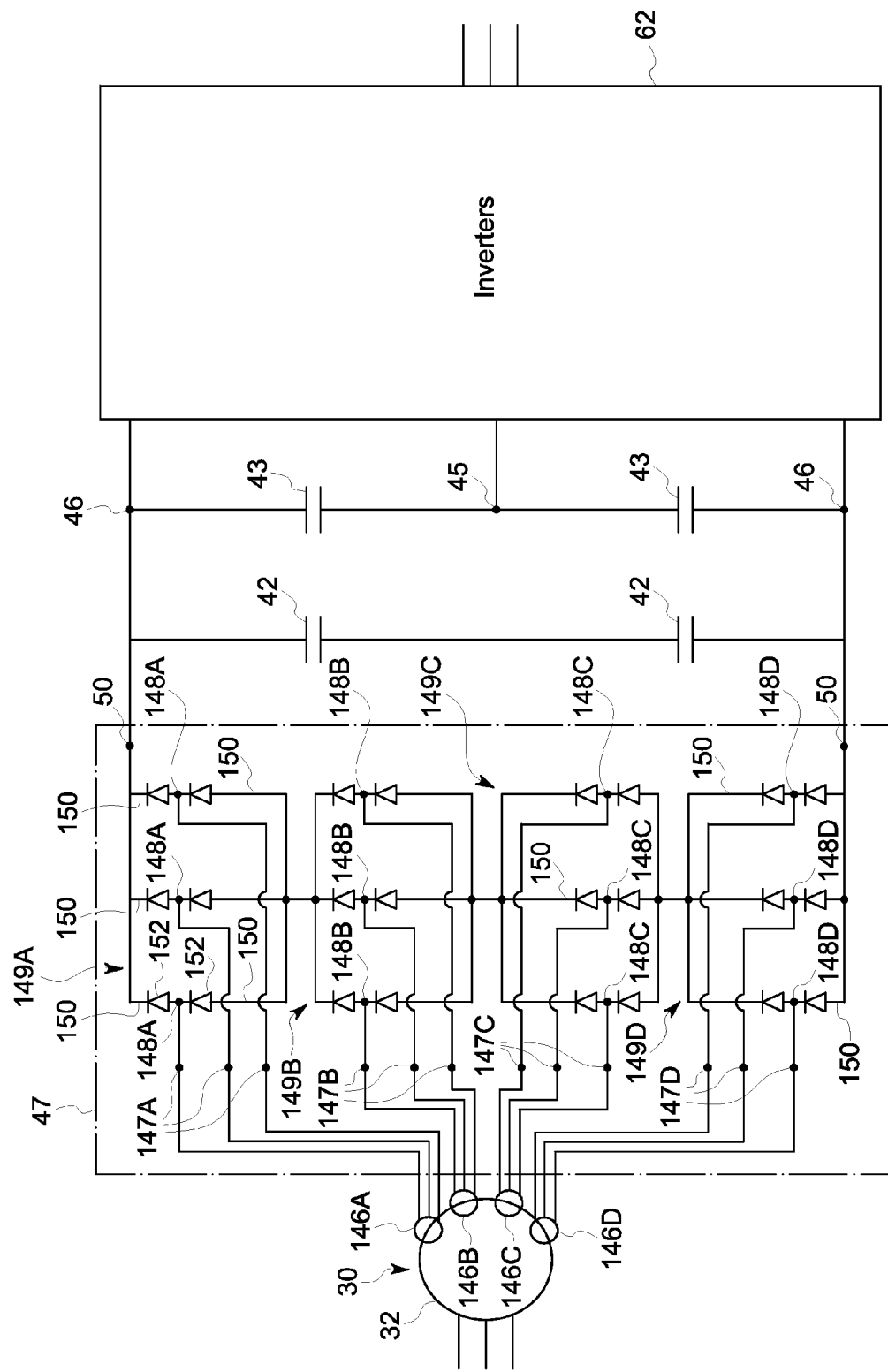
FIG. 5 is an electrical diagram representing one of the voltage rectifiers and one of the voltage inverters from FIG. 4.

FIGS. 4 and 5 illustrate a second embodiment, for which the elements similar to the first embodiment previously described are located by the same references.

Unlike the first embodiment, each first connection terminal 66U, 66V and 66W is directly connected to the electrical grid 12.

Moreover, the power supply system 20 includes M voltage transformers 30. In the embodiment in FIG. 4, the power supply system 20 includes three voltage transformers 30.

Each voltage transformer 30 is connected between the first connection terminals 66U, 66V and 66W and the first conversion device 38. Each voltage transformer 30 comprises a primary winding 32 and Q secondary transformers 146A, 146B, 146C and 146D, Q being a whole number greater than or equal to two.

In the embodiment in FIG. 4, Q is equal to four.

In addition, each first conversion module 47 includes N×Q input terminals 147A, 147B, 147C and 147D and two output terminals 50. In the embodiment in FIG. 5, each first conversion module 47 includes twelve input terminals 147A, 147B, 147C and 147D.

Moreover, unlike the first embodiment, each first module 47 no long has a first magnetic coupling 52. Each voltage rectifier 54 is connected between the twelve input terminals 147A, 147B, 147C and 147D and the two output terminals 50 of the first related conversion module 47.

As shown in FIG. 5, each secondary winding 146A, 146B, 146C and 146D is connected to three input terminals 147A, 147B, 147C and 147D by three respective wire links, each wire link corresponding to a phase of the AC input voltage.

Each output terminal 50 is connected to a respective connection point 46 of a bank of capacitors 36.

Each voltage rectifier 54 includes N×Q input terminals 148A, 148B, 148C and 148D, a positive output terminal 82A and a negative output terminal 82B.

Each rectifier 54 also includes Q diode bridges 149A, 149B, 149C and 149D connected in series between the output terminals 82A and 82B.

In the embodiment in FIG. 5, each voltage rectifier 54 includes twelve input terminals 148A, 148B, 148C and 148D, and four diode bridges 149A, 149B, 149C and 149D. {ut}

Each input terminal 148A, 148B, 148C and 148D makes up input terminals 147A, 147B, 147C and 147D of the first related conversion module 47.

Each diode bridge 149A, 149B, 149C or 149D comprises, as is known, N paths 150 of one-way circulation of a current.

Each path 150 includes at least two diodes 152 connected in series and in the same direction, and connected to each other by a middle point, each middle point making up an input terminal 148A, 148B, 148C or 148D.

In the embodiment in FIG. 5, each path 150 includes two diodes 152 connected in series.

In addition, according to another embodiment, the calculation device 70 no longer has software 138 for calculating control signals of the rectifiers 54. Moreover, the synchronization software 42 is suitable for synchronizing only the control of the switches 88 and 116 of the inverters 62.

The operation of another embodiment is similar to that of the first embodiment previously described and thus is not described again.

Beyond the advantages owing to the first conversion device, the other advantages of another embodiment of the electric drivetrain 16 are identical to those of the first embodiment and thus are not described again. The description of the first embodiment was given in reference to three-phase, three-level rectifiers and inverters clamped by the neutral.

It is, however, understood that embodiments of the present invention similarly apply to multi-phase rectifiers and inverters, each inverter being an inverter of at least two levels, each rectifier being either an "active" rectifier with at least two levels, or a "passive" rectifier, as described, for example, by way of a non-limiting illustration in the embodiment in FIG. 5.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric drivetrain for a device, the drivetrain comprising:
an electric machine comprising:
a power supply system;
a rotor; and
a stator,
wherein the electric machine is an asynchronous electric machine, and the power supply system is configured to supply voltage to the stator of the electric machine, wherein the power supply system making up a source of voltage; and the power supply system being further configured to be electrically connected to an AC electrical grid comprising N phases, N being a whole number greater than or equal to one, wherein the power supply system comprises:
N connection terminals configured to connect to the AC electrical grid, wherein each of the N connection terminals corresponds to a phase of the AC electrical grid;
P terminals configured to connect to the stator of the electric machine, P being a whole number greater than or equal to one;
a first conversion device configured to convert AC voltage comprising N phases to at least one DC voltage; and
a second conversion device configured to convert at least one DC voltage to AC voltage comprising P phases, the second conversion device being connected between the first conversion device and the stator of the electric machine; and
the second conversion device comprises M2 second conversion modules configured to convert DC input voltage to AC output voltage, M2 being a whole number greater than or equal to 2, the M2 second conversion modules being connected in parallel to each other, each of the M2 second conversion modules comprising three second intermediate input terminals, each of the M2 second conversion module being configured to convert one of the intermediate DC voltages to AC output voltage comprising P phases and supplied in P second intermediate output terminals, at least one of the P second intermediate output terminals corresponding to a phase of the AC output voltage, and the second intermediate output terminals corresponding to a same phase being connected to the corresponding connection terminal.

2. The drivetrain according to claim 1, wherein the first conversion device comprises M1 first conversion modules configured to convert AC input voltage to DC output voltage, M1 being a whole number greater than or equal to 2, the M1 first conversion modules being connected in parallel to each other, each of the M1 first conversion modules comprising at least N first intermediate input terminals, each of the at least N first intermediate input terminals corresponding to a phase of the AC input voltage, each of the M1 first conversion module being configured to convert the AC input voltage having N phases into intermediate DC voltage supplied to multiple first intermediate output terminals.

3. The drivetrain according to claim 2, wherein the second conversion device comprises M2 second conversion modules configured to convert DC input voltage to AC output voltage, M2 being a whole number greater than or equal to 2, the M2 second conversion modules being connected in parallel to each other, each of the M2 second conversion modules comprising three second intermediate input terminals, each of the M2 second conversion module being configured to convert one of the intermediate DC voltages to AC output voltage comprising P phases and supplied in P second intermediate output terminals, at least one of the P second intermediate output terminals corresponding to a phase of the AC output voltage, and the second intermediate output terminals corresponding to a same phase being connected to the corresponding connection terminal.

4. The drivetrain according to claim 3, wherein the power supply system further comprises M capacitor banks, M being a whole number greater than or equal to 2, each of the M capacitor banks comprising at least one capacitor, and wherein the whole numbers M, M1 and M2 are equal to each other, the M first modules and the M second modules each being connected to a corresponding bank of capacitors.

5. The drivetrain according to claim 1, wherein each of the M2 second conversion modules comprises a voltage inverter with P phases connected to the three second intermediate input terminals, and a magnetic coupling connected to the output side of the voltage inverter.

6. The drivetrain according to claim 5, wherein each of the voltage inverters comprises P switching paths, each of the P switching paths comprising at least two controllable electronic switches connected in series at a connection point, each of the connection points being connected to the magnetic coupling, and the power supply system further comprises a calculator configured to calculate the control signals of the at least two controllable electronic switches of the voltage inverters, and to produce a time lag of the carrier signals of at least two corresponding voltage inverters.

7. The drivetrain according to claim 2, wherein each of the M1 first conversion modules comprises N first intermediate input terminals, a magnetic coupling connected to the N first intermediate input terminals, and a voltage rectifier with N phases connected to the output side of the magnetic coupling.

8. The drivetrain according to claim 7, wherein the voltage rectifier comprises N switching paths, each of the N switching paths comprising at least two controllable electronic switches connected in series at a connection point, each of the connection points being connected to the magnetic coupling.

9. The drivetrain according to claim 6, wherein the voltage rectifier comprises N switching paths, each of the N switching paths comprising at least two controllable electronic switches connected in series at a connection point, each of the connection points being connected to the magnetic coupling, and wherein the power supply system is configured to synchronize the switching of the electronic switches of each switching path of each voltage rectifier and each voltage inverter.

10. The drivetrain according to claim 2, wherein the M1 first conversion modules comprise N×Q first intermediate input terminals, Q being a greater than or equal to two, and a voltage rectifier with N phases connected to the first intermediate input terminals, the voltage rectifier with N phases comprising Q diode bridges connected in series, each of the Q diode bridges comprising N paths of one-way circulation of a current, each of the N paths of one-way circulation of a current comprising at least two diodes connected in series at a connection point, each of the connection points being connected to one of the first intermediate input terminals.

11. A gas compression equipment, comprising:
a gas compression device; and
an electric drivetrain for the compression device, wherein the electric drivetrain comprises:
an electric machine comprising:
a power supply system;
a rotor; and
a stator,
wherein the electric machine is an asynchronous electric machine, and the power supply system is configured to supply voltage to the stator of the electric machine, wherein the power supply system making up a source of voltage;
the power supply system being further configured to be electrically connected to an AC electrical grid comprising N phases, N being a whole number greater than or equal to one, wherein the power supply system comprises:
N connection terminals configured to connect to the AC electrical grid, wherein each of the N connection terminals corresponds to a phase of the AC electrical grid;

P terminals configured to connect to the stator of the electric machine, P being a whole number greater than or equal to one;

a first conversion device configured to convert AC voltage comprising N phases to at least one DC voltage; and a second conversion device configured to convert at least one DC voltage to AC voltage comprising P phases, the second conversion device being connected between the first conversion device and the stator of the electric machine; and the first conversion device comprises M1 first conversion modules configured to convert AC input voltage to DC output voltage, M1 being a whole number greater than or equal to 2, the M1 first conversion modules being connected in parallel to each other, each of the M1 first conversion modules comprising at least N first intermediate input terminals, each of the at least N first intermediate input terminals corresponding to a phase of the AC input voltage, each of the M1 first conversion module being configured to convert the AC input voltage having N phases into intermediate DC voltage supplied to multiple first intermediate output terminals.

12. The gas compression equipment according to claim 11, wherein the second conversion device comprises M2 second conversion modules configured to convert DC input voltage to AC output voltage, M2 being a whole number greater than or equal to 2, the M2 second conversion modules being connected in parallel to each other, each of the M2 second conversion modules comprising three second intermediate input terminals, each of the M2 second conversion module being configured to convert one of the intermediate DC voltages to AC output voltage comprising P phases and supplied in P second intermediate output terminals, at least one of the P second intermediate output terminals corresponding to a phase of the AC output voltage, and the second intermediate output terminals corresponding to a same phase being connected to the corresponding connection terminal.

13. The gas compression equipment according to claim 11, wherein the second conversion device comprises M2 second conversion modules configured to convert DC input voltage to AC output voltage, M2 being a whole number greater than or equal to 2, the M2 second conversion modules being connected in parallel to each other, each of the M2 second conversion modules comprising three second intermediate input terminals, each of the M2 second conversion module being configured to convert one of the intermediate DC voltages to AC output voltage comprising P phases and supplied in P second intermediate output terminals, at least one of the P second intermediate output terminals corresponding to a phase of the AC output voltage, and the second intermediate output terminals corresponding to a same phase being connected to the corresponding connection terminal.

14. The gas compression equipment according to claim 13, wherein the power supply system further comprises M capacitor banks, M being a whole number greater than or equal to 2, each of the M capacitor banks comprising at least one capacitor, and wherein the whole numbers M, M1 and M2 are equal to each other, the M first modules and the M second modules each being connected to a corresponding bank of capacitors.

15. The gas compression equipment according to claim 12, wherein each of the M2 second conversion modules comprises a voltage inverter with P phases connected to the three second intermediate input terminals, and a magnetic coupling connected to the output side of the voltage inverter.

16. The gas compression equipment according to claim 15, wherein each of the voltage inverters comprises P switching paths, each of the P switching paths comprising at least two controllable electronic switches connected in series at a connection point, each of the connection points being connected to the magnetic coupling, and the power supply system further comprises a calculator configured to calculate the control signals of the at least two controllable electronic switches of the voltage inverters, and to produce a time lag of the carrier signals of at least two corresponding voltage inverters.

* * * * *